United States Patent [19]

Blaseck

[11] Patent Number: 4,527,934
[45] Date of Patent: Jul. 9, 1985

[54] REMOTELY-CONTROLLED MANIPULATOR CARRIER SYSTEM FOR A LARGE-AREA CELL OF A NUCLEAR FACILITY

[75] Inventor: Klaus Blaseck, Burgdorf, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 510,351

[22] Filed: Jul. 1, 1983

[30] Foreign Application Priority Data

Jul. 2, 1982 [DE] Fed. Rep. of Germany ....... 3224703

[51] Int. Cl.³ .......................... B65G 61/00; B25J 5/04
[52] U.S. Cl. ......................................... 414/4; 901/17; 414/631
[58] Field of Search ................................ 414/630–632, 414/637, 628, 629, 281, 4, 744 R, 744 A, 744 B, 744 C, 787; 901/14, 16, 17

[56] References Cited

U.S. PATENT DOCUMENTS

| | | | |
|---|---|---|---|
| 2,869,734 | 1/1959 | Ernestus | 414/281 X |
| 2,978,118 | 4/1961 | Goertz | 414/4 |
| 4,014,439 | 3/1977 | Kochsiek et al. | 414/787 |
| 4,063,651 | 12/1977 | Chino | 414/628 |

FOREIGN PATENT DOCUMENTS

| | | | |
|---|---|---|---|
| 1003131 | 2/1957 | Fed. Rep. of Germany | 414/281 |
| 69834 | 3/1952 | Netherlands | 414/637 |

*Primary Examiner*—Terrance L. Siemens
*Attorney, Agent, or Firm*—Walter Ottesen

[57] ABSTRACT

Remotely-controlled manipulator carrier systems are used in large-area hot cells such as a facility for reprocessing irradiated nuclear fuel materials. The system is used to perform manual-like operations on the process equipment in the hot cell which is disposed in racks along two longitudinally extending walls of the hot cell enclosure, the racks being filled with process equipment and defining a passageway in the direction of the longitudinal axis of the enclosure. The system includes a vertical guide column which is connected to the bridge beam of an overhead bridge crane. A support is mounted on the guide column for movement up and down the column. An extendible arm is cantilever-mounted on the support and has a manipulator or other remotely-controlled apparatus at its outer end. The extendible arm is to be subjected to a minimal bending moment when work is done in the racks containing the process equipment. For this purpose, the guide column is mounted at its respective ends between rotating upper and lower plates aligned to rotate about a common vertical rotational axis. The upper plate is rotatably mounted on the bridge beam; whereas, the lower plate is rotatably mounted on a base platform movable along a track on the passageway. The guide column is arranged between the upper and lower plates so as to be eccentric with respect to the vertical rotational axis whereby the guide column is movable, with the rotation of the upper and lower plates, to the racks on the left side of the passageway or to the racks on the right side thereof, as desired, and into proximity to the process equipment thereby reducing the distance to which the extendible arm has to be extended to permit work on the process equipment.

3 Claims, 3 Drawing Figures

REMOTELY-CONTROLLED MANIPULATOR CARRIER SYSTEM FOR A LARGE-AREA CELL OF A NUCLEAR FACILITY

FIELD OF THE INVENTION

The invention is directed to a manipulator carrier system for performing remotely-controlled, manual-like operations on process components in a large-area hot cell such as a facility for reprocessing irradiated nuclear fuel materials.

BACKGROUND OF THE INVENTION

Facilities for the reprocessing of irradiated nuclear fuel materials are equipped with so-called hot cells for holding the components needed for conducting the industrial processes associated therewith. In these radiation-shielded cells, the process components are arranged in scaffold-like structures or racks as they are sometimes referred to.

The maintenance work within the hot cell affected by radioactive radiation should be conducted preferably without the necessity of operating personnel entering the hot cell. Solutions have been therefore sought to conduct the maintenance work by means of remotely-controlled equipment which can be movable within the hot cell. For this purpose, it is desirable that the racks holding the components used in the industrial processes be arranged in mutually adjacent rows longitudinally along the walls of the hot cell. In this way, a center passageway is formed along which the remotely-controlled equipment for the maintenance work can be moved and fully-loaded racks can be exchanged.

It is intended that a remotely-controlled manipulator carrier system be arranged in this passageway which will make it possible to reach the process components from this position by acting in the horizontal direction. With this manipulator carrier system, service and maintenance apparatus as well as tools are positioned. The manipulator carrier system opens up the possibility of using servo-manipulators and power manipulators as well as robots and/or programmed devices. With manipulators and lifting devices presently available, manual-like operations can be performed with small components in dependence upon the extendible arm of the carrier system.

The manipulator carrier system essentially includes a vertical guide column which is connected to the movable bridge beam of an overhead bridge assembly arranged to travel above the process components in the direction of the longitudinal axis of the large-area cell. The guide column can be mounted so as to be rotatable about its longitudinal axis and can be supported on the floor of the passageway. The rotatable guide column includes an extendible arm mounted on a support movable in the vertical direction. The extendible arm can be provided with the tools or a manipulator or other remotely-controlled device.

The extendible arm is often configured as a telescopically extendible arm in order to reach different work locations at respectively different depths in the racks. However, the deeper that the work location is in the rack, the higher will be the bending moment applied to the arm. To enable the extendible arm to take up an adequate load, it is desirable to keep the length to which the arm has to be extended to a minimum.

SUMMARY OF THE INVENTION

It is an object of the invention to provide a remotely-controlled manipulator carrier system of the type described above wherein the distance to the racks is kept as low as possible.

The manipulator-carrier system of the invention performs remotely-controlled manual-like operations on process components in a large-area hot cell such as a facility for reprocessing irradiated nuclear fuel materials. The hot cell is an enclosure with the process components disposed in racks along two longitudinally extending walls thereof so as to thereby conjointly define a passageway in the direction of the longitudinal axis of the enclosure. The system includes an overhead bridge crane assembly having the bridge beam extending transversely to the longitudinal axis of the enclosure and track means for guiding the bridge beam in a horizontal plane above the process components in the direction of said axis. A movable base assembly is part of the system and includes a base platform and platform guide means for guiding the base platform on and along the passageway in the direction of the longitudinal axis of the enclosure.

The system of the invention further includes a manipulator assembly mounted between the bridge beam and the base platform. The manipulator assembly includes an upper plate rotatably mounted on the bridge beam so as to define a vertical rotational axis perpendicular to the above-mentioned horizontal plane; a lower plate disposed beneath the upper plate and rotatably mounted on the base platform so as to be rotatable about the vertical rotational axis; a guide column mounted between the plates and extending in the vertical direction; and manipulator means including: a support movably mounted on the guide column so as to be movable thereon in the vertical direction; an extendible arm mounted on the support; and, a manipulator mounted at the outer end of the arm for engaging and performing manual-like operations on the process components.

The guide column is mounted between the plates so as to be eccentric with respect to the vertical rotational axis whereby the column is movable, with the rotation of the upper and lower plates, to the left or right side of the passageway, as desired, and into close proximity to the process components thereby reducing the distance to which the extendible arm has to be extended to permit the manipulator to perform manual-like operations on the process components.

Because the guide column is arranged eccentrically between the two rotatable plates as described above, the guide column can be displaced from a location in the center of the hot cell to a location very close to a rack wherein work is to be performed. Since the guide column can be brought to a position so close to the rack, it is apparent that the extendible arm need be extended a substantially lesser distance as would be the case where a guide column is required to remain at the longitudinal center of the hot-cell enclosure, that is, in the center of the passageway. Thus, in the system of the invention, the extendible arm has to be extended a substantially lesser distance than in conventional systems and can therefore take up a higher load.

According to another feature of the invention, a plurality of guide columns can be arranged between the upper and lower plates and can be equipped with respective manipulator means for holding respectively different tools. Thus, in a maintenance program, it would be possible to complete all steps of the program without a need for reequipping the extendible arm.

BRIEF DESCRIPTION OF THE DRAWING

The invention will now be explained with reference to the drawing wherein.

DESCRIPTION OF THE PREFERRED EMBODIMENTS OF THE INVENTION

Figure 1:
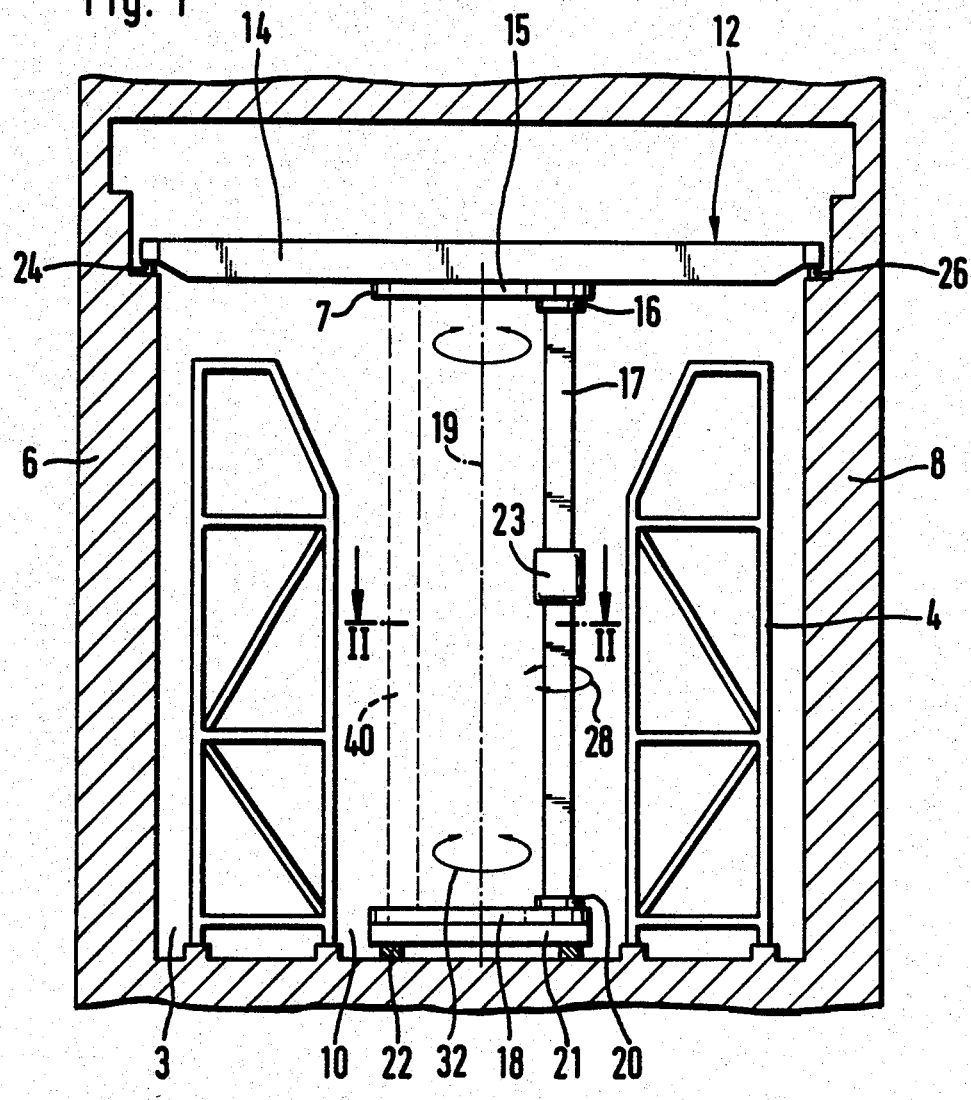
FIG. 1 is an elevation view of a large-area hot cell equipped with an embodiment of the system of the invention for performing remotely-controlled operations on process equipment contained in a large-area hot cell.

Referring to FIG. 1, a large-area hot cell 3 contains several frames or racks 4 disposed along mutually-adjacent walls 6 and 8. These racks 4 contain the process components (not shown) which are to be maintained by the system according to the invention. The mutually-adjacent rows of racks 4 conjointly define a canyon-like transport passageway 10 along which a manipulator assembly 7 of the manipulator-carrier system 12 can be moved and accommodated.

The manipulator-carrier system includes an overhead bridge crane assembly having a bridge beam 14 disposed so as to be transverse to the longitudinal axis of the hot cell and is movable in a horizontal plane above the racks 4. The bridge beam is guided by track means 24 and 26 mounted in respective side walls 6 and 8 of the large-area hot cell for movement in the direction of the longitudinal axis of the enclosure.

The manipulator assembly includes an upper plate 15 rotatably mounted on the lower surface of the bridge beam 14 so as to be centrally disposed with respect to the passageway 10. The upper end 16 of a vertical guide column 17 is mounted close to the edge of the rotatable plate 15. The lower end 20 of the guide column 17 is mounted to a lower rotatable plate 18. The guide column 17 is mounted between both plates 15 and 18 so as to be rotatable about its own longitudinal axis as indicated by arrow 28.

The upper and lower rotatable plates 15 and 18 are disposed with respect to each other so as to rotate about the same vertical rotational axis. The rotation of the manipulator assembly about axis 19 is indicated by arrow 32.

Figure 2:
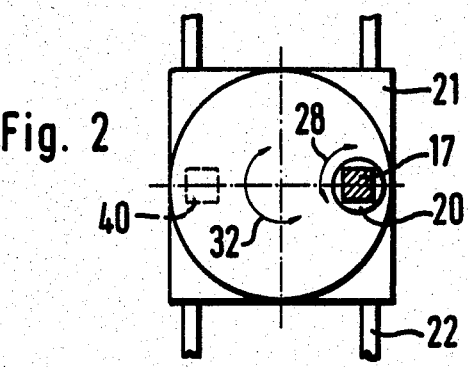
FIG. 2 is a plan view taken along line II—II of FIG. 1 showing the movable base assembly.

The rotatable lower plate 18 is rotatably mounted on the receiving plate or base platform 21. The base platform 21 is movably guided along the passageway 10 by guide means in the form of floor rails 22. FIG. 2 is a plan view showing rotatable lower plate 18 mounted to the base platform 21 of the movable base assembly.

Figure 3:
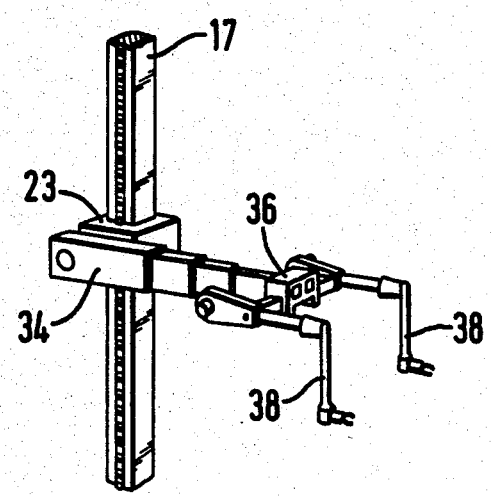
FIG. 3 is a perspective view of a portion of the guide column of the manipulator assembly showing a manipulator and an extendible arm mounted in a cantilever-like manner to a support on the guide column.

The manipulator assembly includes manipulator means mounted on the guide column 17 for working on the process equipment of the hot cell. The manipulator means is shown in FIG. 3 and includes a support 23 movably mounted on the guide column 17 for movement up and down thereon. A telescopically-extendible arm 34 of the manipulator means is mounted on the support 23 so as to extend in a cantilever-like manner therefrom. The arm 34 has remotely-controlled manipulator 36 mounted on its outer end. The manipulator 36 is a master-slave device having two slave arms 38.

By synchronously rotating the upper and lower plates 15 and 18, the guide column 17 can be brought into close proximity to each of the rows of racks 4. Accordingly, the distance which the extendible arm 34 has to bridge to reach the process components is thereby very substantially reduced. The bending moment to which the extendible arm 34 is subjected is reduced so that greater loads may be applied thereto. A reduced deformation of the extendible arm 34 is obtained because it is of shorter length.

Reference numeral 40 indicates in phantom outline that additional guide columns can be mounted eccentrically of the rotational axis 19 between the upper and lower plates 15 and 18. Each such column would have associated therewith a manipulator means.

It is understood that the foregoing description is that of the preferred embodiments of the invention and that various changes and modifications may be made thereto without departing from the spirit and scope of the invention, as defined in the appended claims.

What is claimed is:

1. A manipulator-carrier system for performing remotely-controlled manual-like operations on process equipment in a large-area hot cell such as a facility for reprocessing irradiated nuclear fuel materials, the hot cell being an enclosure with the process equipment disposed along two longitudinally extending walls thereof to define a passageway in the direction of the longitudinal axis of the enclosure, the system comprising:

an overhead bridge crane assembly including: a bridge beam extending transversely to said longitudinal axis; and track means for guiding said bridge beam in a horizontal plane above the process equipment in the direction of said axis;

a movable base assembly including: a base platform; and platform guide means for guiding said base platform along said passageway in the direction of the longitudinal axis of the enclosure;

a manipulator assembly mounted between said bridge beam and said base platform, the manipulator assembly including:

an upper plate rotatably mounted on said bridge beam so as to define a vertical rotational axis perpendicular to said horizontal plane;

a lower plate disposed beneath said upper plate and rotatably mounted on said base platform so as to be rotatable about said vertical rotational axis;

a guide column mounted between said plates and extending in the vertical direction; and manipulator means including: a support movably mounted on said guide column so as to be movable thereon in the vertical direction; an extendible arm mounted on the support and having a manipulator mounted at the outer end of said arm for engaging and performing manual-like operations on the process equipment; and said guide column being mounted between said plates so as to be eccentric with respect to said vertical rotational axis whereby said column is movable, with the rotation of said plates, to the left or right side of the passageway, as desired, and into close proximity to the process equipment thereby reducing the distance to which said extendible arm has to be extended to permit said manipulator to perform manual-like operations on the process equipment.

2. The system of claim 1, said guide column being mounted between said plates at its respective ends so as to be rotatable about its longitudinal columnar axis.

3. The system of claim 2 comprising: a plurality of said guide columns mounted eccentrically of said vertical rotational axis and between said upper and lower plates; and a plurality of said manipulator means associated with corresponding ones of said guide columns.

* * * * *